(12) United States Patent
Bauerle et al.

(10) Patent No.: US 9,703,616 B2
(45) Date of Patent: Jul. 11, 2017

(54) EXECUTING A COMMAND ON AN OPTIMAL SMART DEVICE

(71) Applicant: INTERNATIONAL BUSINESS MACHINES CORPORATION, Armonk, NY (US)

(72) Inventors: Frank Richard Bauerle, Arlington, TX (US); Grant Douglas Miller, Arvada, CO (US); Nader M Nassar, Yorktown Heights, NY (US); Tamer Nassar, Bethel, CT (US); Irene Robin Penney, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 14/451,480

(22) Filed: Aug. 5, 2014

(65) Prior Publication Data

US 2016/0041851 A1 Feb. 11, 2016

(51) Int. Cl.
| | |
|---|---|
| G06F 15/173 | (2006.01) |
| G06F 9/52 | (2006.01) |
| H04L 29/08 | (2006.01) |
| H04L 29/06 | (2006.01) |
| H04L 12/24 | (2006.01) |

(52) U.S. Cl.
CPC ........ *G06F 9/524* (2013.01); *H04L 29/08108* (2013.01); *H04L 29/06* (2013.01); *H04L 29/08072* (2013.01); *H04L 29/08099* (2013.01); *H04L 41/0213* (2013.01)

(58) Field of Classification Search
CPC ......... G06F 9/524; H04L 43/04; H04L 29/06; H04L 29/08072; H04L 29/08099; H04L 29/08108; H04L 41/0213

USPC .................................................. 709/223–224
See application file for complete search history.

(56) References Cited

U.S. PATENT DOCUMENTS

| | | | |
|---|---|---|---|
| 6,513,006 B2 | 1/2003 | Howard et al. | |
| 6,542,930 B1* | 4/2003 | Auvenshine | G06F 17/30067 707/E17.01 |
| 6,983,320 B1* | 1/2006 | Thomas | G06Q 10/10 707/999.005 |
| 8,204,992 B2 | 6/2012 | Arora et al. | |
| 8,225,001 B2* | 7/2012 | Hart | G06F 8/61 709/205 |
| 8,307,082 B2 | 11/2012 | Majanen et al. | |
| 8,918,761 B1* | 12/2014 | Whitcomb | G06F 8/71 709/223 |
| 2007/0039024 A1* | 2/2007 | Krajcev | G06Q 10/02 725/46 |
| 2007/0087756 A1* | 4/2007 | Hoffberg | G06Q 10/0631 455/450 |

(Continued)

*Primary Examiner* — Thu Ha Nguyen
(74) *Attorney, Agent, or Firm* — Scully, Scott, Murphy & Presser, P.C; Kurt P. Goudy

(57) ABSTRACT

Executing a command on an optimal smart device. One aspect of the present invention provides a method for executing a command. The method includes: receiving a command at a plurality of smart devices; determining a score for each smart device of the plurality of smart devices; communicating the score between each smart device of the plurality of smart devices; comparing the score between each smart device of the plurality of smart devices; and executing the command at one smart device of the plurality of smart devices based on comparing the score between each smart device.

20 Claims, 9 Drawing Sheets

(56) References Cited

U.S. PATENT DOCUMENTS

| | | | | |
|---|---|---|---|---|
| 2008/0102954 | A1* | 5/2008 | Schueller | A63F 13/338 463/40 |
| 2009/0183208 | A1* | 7/2009 | Christensen | H04N 7/17318 725/58 |
| 2010/0124196 | A1* | 5/2010 | Bonar | H04B 7/0689 370/329 |
| 2010/0241595 | A1* | 9/2010 | Felsher | G06F 19/322 705/400 |
| 2011/0191310 | A1* | 8/2011 | Liao | G06F 17/30616 707/706 |
| 2012/0036125 | A1* | 2/2012 | Al-Kofahi | G06F 17/30637 707/728 |
| 2013/0218885 | A1* | 8/2013 | Satyanarayanan | G06Q 30/016 707/728 |
| 2014/0316836 | A1* | 10/2014 | Lipscher | G06Q 10/1093 705/7.19 |
| 2015/0019583 | A1* | 1/2015 | Mittelstadt | G06F 17/30442 707/765 |
| 2015/0319230 | A1* | 11/2015 | Skjolsvold | H04L 67/101 709/224 |
| 2016/0182170 | A1* | 6/2016 | Daoura | H04H 20/59 455/3.01 |

\* cited by examiner

202

EXECUTING A COMMAND ON AN OPTIMAL SMART DEVICE

BACKGROUND OF THE INVENTION

The Internet of Things (IoT) is a system which includes a variety of devices, network connections, information exchange, and communication in order to achieve intelligent identification, positioning, tracking, monitoring, and management of the system. IoT allows the main features of each device to be addressed, be controlled, and facilitate communication between devices.

Many IoT systems include defined networked devices that communicate among themselves. However, many IoT systems are not capable of including an unknown or variable set of context-sensitive smart devices. IoT is working on being seamless, faster, and increasing the number of devices in the mesh. There is a need to make these IoT devices include a level of context awareness that results in optimal intelligence among the mesh of connected devices.

SUMMARY OF THE INVENTION

One aspect of the present invention provides a method for executing a command. The method includes: receiving a command at a plurality of smart devices; determining a score for each smart device of the plurality of smart devices; communicating the score between each smart device of the plurality of smart devices; comparing the score between each smart device of the plurality of smart devices; and executing the command at one smart device between the plurality of smart devices based on comparing the score of each smart device.

A second aspect of the present invention provides a system for executing a command. The system includes: a memory; a processor device coupled to the memory; and a context-sensitive negotiation module communicatively coupled to the memory and the processor device, the context sensitive negotiation module comprising the steps of a method. The method includes receiving a command at a plurality of smart devices; determining a score for each smart device of the plurality of smart devices; communicating the score between each smart device of the plurality of smart devices; comparing the score between each smart device of the plurality of smart devices; and executing the command at one smart device of the plurality of smart devices based on comparing the score between each smart device.

A third aspect of the present invention provides a computer program product for executing a command, the computer program product comprising a computer readable storage medium having program instructions embodied therewith, wherein the computer readable storage medium is not a transitory signal per se, the program instructions executable by a computer to cause the computer to perform the above-identified method.

DETAILED DESCRIPTION OF THE PREFERRED EMBODIMENTS

Figure 1:
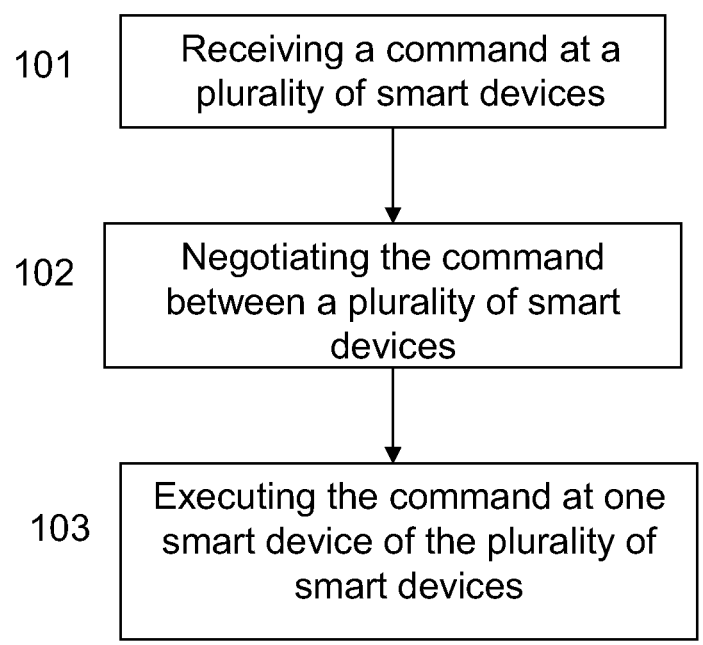
FIG. 1 is a flowchart describing the method for executing a command on an optimal smart device according to an embodiment of the present invention.

The present invention can be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a flowchart describing the method for executing a command on an optimal smart device according to an embodiment of the present invention. The smart devices are preferably in an IoT system in which they can communicate with one another. Step 101 includes receiving the command at a plurality of smart devices. Step 102 includes negotiating the command between the plurality of smart devices. As a result of the negotiation process, in step 103, the command is executed at one smart device of the plurality of smart devices.

In an embodiment of the present invention, the command can be a predefined command or a new command. The source of the command can be transferred by any portable electronic device that is able to transmit messages to the system. The portable electronic device can be a cell phone, a laptop, or any other device can be used in the relevant art. The command can be a voice command, or a textual command or any other method can be used in the relevant art that communicate the command to the plurality for smart devices.

In another embodiment of the present invention, if the smart device is unable to read the command, a reissue request from the plurality of smart devices is sent to the source of the command. The source of the command then resends the command in the same or different form.

Figure 2:
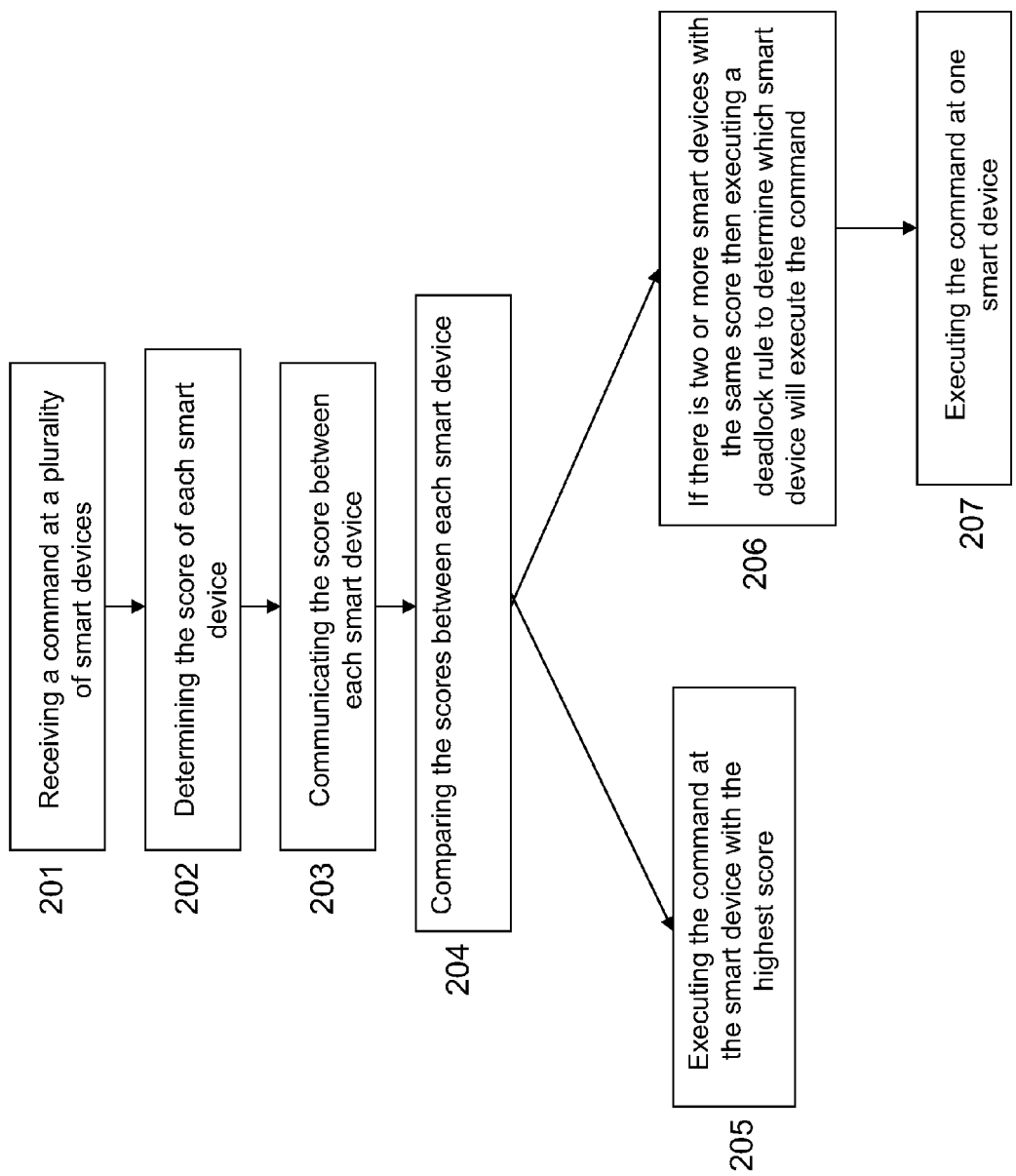
FIG. 2 is a detailed flowchart describing the method for executing a command on an optimal smart device according to a further embodiment of the present invention.

FIG. 2 is a detailed flowchart of a method for executing a command on an optimal smart device according to an embodiment of the present invention. Similar to FIG. 1, step 201 includes receiving a command at a plurality of smart devices. This can be a predefined command or a new command. According to the present invention, the command is received at each smart device in the network. In step 202, each smart device determines its score. Step 202 will be detailed in reference to FIG. 3. Next, in step 203, the system communicates the score between each smart device. Each smart device of the plurality of smart devices communicates its scores to each of the other smart devices. The communication includes transmitting the score to each smart device as well as receiving the score from each device. The communication method may include wireless communications such as Bluetooth, Near Field Communication (NFC), Radio-frequency identification (RFID), Infrared (IR), 2G Cellular, 3G Cellular, etc.

Referring to FIG. 2, in step 204, the plurality of smart devices compares the scores between each of the smart devices. The comparative analysis performed in each smart device is completed by using any method in the relevant art. For example, there are multiple comparative methods that can be leveraged for determining which device is best suited to respond to a command. A simple "first in-first out" (FIFO) method of responding could be used. The first device to respond to a command (based on timestamp of that devices response) would be tasked with executing the command. For single-purpose smart devices that can only respond a single command, a binary comparative method might be appropriate, such as is the device capable of responding to the command and are there any other dedicated devices on the network. In this situation, the simple, single purpose smart device would be tasked with executing the command because it can be assumed that because it is focused on just a single command, it is best suited to respond.

According to the present invention, the comparative method can be based on comparing the weighted score of evaluating the smart device rules to determine which smart device should execute the command. An aggregate score would be generated per smart device and the smart device with the highest aggregate score would then be tasked with responding. Given the different types of smart devices that can execute a command, a normalized score can be generated to determine which smart device should execute the command.

The scores are dependent on multiple variables of the smart device (primary or secondary), which may include the following criteria: where the device is currently located, type of communication network the smart device is using, and other rules as determined by the smart device manufacturer, application creator, and/or smart device owner. In comparing the scores each smart device determines whether its score is lower or higher than the other smart devices in the system. If the score is lower, the smart device will terminate communicating its score and will not execute the command. If the score of the smart device is higher than the other smart devices then the smart device will continue broadcasting its score to ultimately decide not to execute the command or to execute the command. If there is one smart device with the highest score, the method proceeds to step 205. In step 205, the one smart device having the highest score will execute the command. If there are two or more smart devices with the same score then the method proceeds to step 206 and a deadlock rule will be executed. A deadlock rule determines one smart device from the two or more smart devices with the same score to execute the command. For example, a deadlock rule can be that the smart device to receive the command from the source first executes the command. The deadlock rule is predetermined and inputted in each smart device. Once the deadlock rule has been executed the method proceeds to step 207, and one smart device of the two or more smart devices executes the command.

According to the present invention, each smart device includes a digital identity that allows it to be identified by the other smart devices in the system. The unique digital identity will be assigned to each smart device automatically or given by the user when a new smart device joins the network. For example, each device on a network is uniquely identified with their MAC Address.

According to the present invention, a smart device can be a single-purpose and/or a multi-purpose smart device. Single-purpose smart devices are capable of executing a single command. For example, a toaster is capable of toasting bread (or bagels, etc). A multi-purpose smart device is capable of fulfilling a range of requests. For example, a smart phone or next-generation television are considered multi-purpose devices. Single-purpose devices and multi-purpose devices generally have hardware and a software platform. The intelligence of sing-purpose and multi-purpose devices are typically encoded into the device. When the devices are manufactured, the purpose and rules for responding to the target command are embedded into the device. The logic for responding to these commands can be embedded in the circuitry of the device or programmed can be used in the relevant art.

According to the present invention, each smart device includes object rules that determine the score of the smart device. The object rules include at least one context-sensitive rule. Context-sensitive rules permit each smart device in the system to react to the context of the smart device. The context of the smart device can be device purpose, understanding the source of the command, the ownership of the smart device, what command is the device authorized to fulfill, "home" territory of the device, present location of the device, the primary purpose of the device and/or any other context parameters known in the relevant art. In an embodiment of the present invention, each smart device in the system is a context-sensitive device that includes at least one context-sensitive rule.

Figure 3:
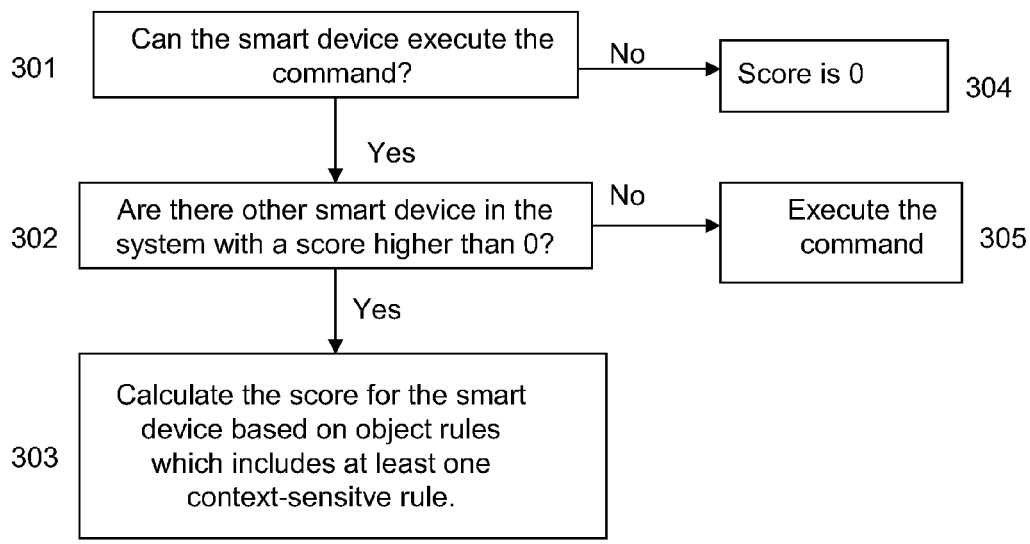
FIG. 3 further describes the method for determining the score of each smart device according to a further embodiment of the present invention.

FIG. 3 describes step 202 from FIG.2 and further describes determining the score of the smart device according to an embodiment of the present invention. As shown in FIG. 3, in step 301, the smart device determines if it can execute the command. This is determined by the device inherently understanding which commands it is capable of responding. The list of commands that a smart device can respond to is a variable and dependent on the applications installed on the smart device. The command issued will be mapped to the list of supported commands and a respond as to whether the device can or cannot execute the command. After understanding each command and the task it requires, the smart device can determine whether or not it can execute the command. At that point, if the smart device is unable to execute the command it proceeds to step 306 and its score is 0. The present invention is not limited to numerical scoring. Other methods of scoring can be used in the relevant art can be used.

Referring to FIG. 3, if the smart device can execute the command then the method proceeds to step 302. In step 302, the smart device determines if there are other smart devices in the system that have a score greater than 0. This can be accomplished by each smart device broadcasting its score, and if a smart device receives a score that is not 0, then the method proceeds to step 303. If there are no other smart devices with a score greater than 0, then the method proceeds to step 305. In step 305, the smart device will then execute the command. If there are other smart devices with a score higher than 0, then the method proceeds to step 303. In step 303, the smart device will calculate its score based on the object rules which include at least one context-sensitive rule.

According to the present invention, each smart device calculates the score for its smart device to determine if the smart device is the optimal smart device in the system to execute the command. Certain object rules can have a higher value based on its weight allocation. For instance, ownership of the smart device can have a higher value due to a higher weight allocation in an embodiment of the present invention. The ownership of the smart device can be determined by voice recognition. Another context-sensitive rule can be the location of the smart device. Other examples of object rules may include: connectivity or utilization of the device, if executing the command will impact cost, and/or any limitations on use of the smart device.

In an embodiment of the present invention, each object rule includes a weight allocation that determines the value of the object rule. The weight allocations can be predetermined by the user of the system. For example, the weight allocated to an object rule that illustrates the user preference for use of the smart device can be greater than the weight allocated to the object rule that governs the connectivity of the smart device. For example, the object rule that governs user preferences can be 20 and connectivity can be 10. Therefore, even if one smart device has proficient connectivity, the smart device that the user prefers will execute the command.

According to the present invention, rules and associated weights will be stored in a tabular format—although a database may be leveraged to optimize rule and weight management. Each rule definition can include at least one of, but not limited to: Rule ID, Rule definition, Weight, Effectivity (date, time windows that the rule may be effective), and a combination thereof. For many smart devices, rules can be managed dynamically allowing the device owner to optimize and prioritize the response for a given command.

According to an embodiment of the present invention, for each smart device to manage all requests it processes, the rules and weighting associated with individual rules in a datastore closely associated with the device operating system. The rule database and assigned weights can stored on the local storage unit whether that storage be via a hard disk or flash storage or any other memory storage unit known in the relevant art. The processing and responding to individual requests should be handled in memory as part of the core device. Once a request is processed and a decision is made on whether the individual device should respond, the request is no longer needed on the individual smart device and may be removed from memory.

According to an embodiment of the present invention, the memory device can include how each smart device responds to specific commands so that rule management and weight allocations can be adjusted to help optimize responses.

In a further embodiment of the present invention, once the scores are calculated by each smart device, each smart device compares its own score with scores of the other smart devices in the network until one smart device is left. In one embodiment of the present invention, a bubble sort method can be used by the smart devices to determine the smart device with the highest score. The bubble sort method will be able to execute the bubble sort algorithm. The bubble sort algorithm can recursively step through the list of scores and compare them to put them in descending or ascending order. This way the smart device with the highest score can be selected as the optimal smart device to execute the command.

Figure 4:
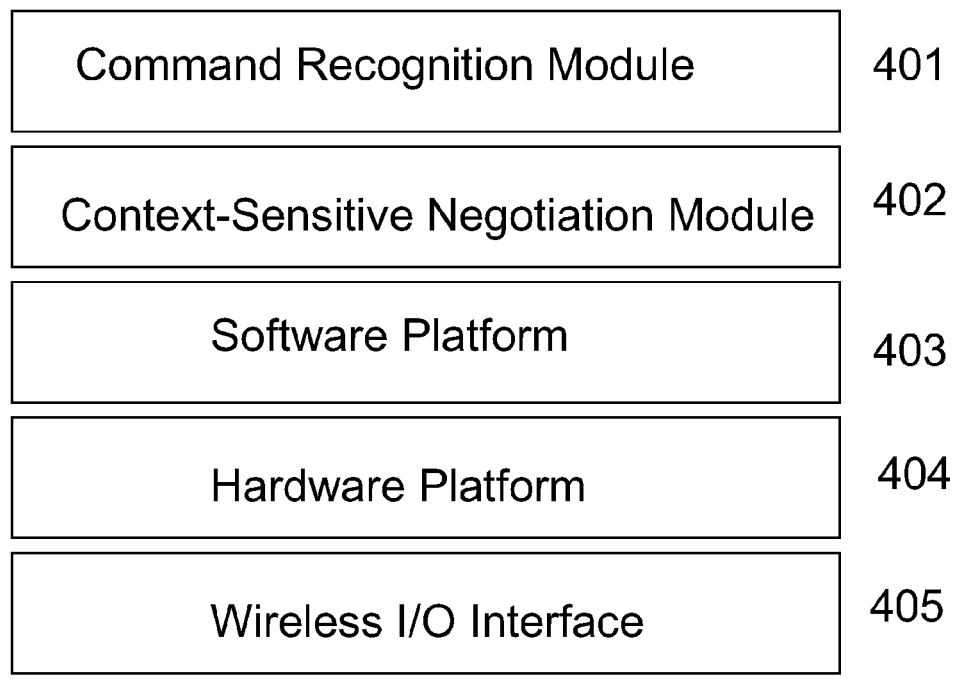
FIG. 4 displays a layered platform of an IoT system according to a further embodiment of the present invention.

FIG. 4 displays a layered platform of a smart device in an IoT system according to an embodiment of the present invention. According to the present invention the smart devices are able to negotiate between themselves in a peer-to-peer network. Referring to FIG. 4, in each smart device there is a command recognition module 401 that receives and processes the command from the source. Next, the context-sensitive negotiation module 402 layer facilitates the negotiation between the smart devices. The software 403 and the hardware 404 platforms encompass the software and hardware functionalities in the smart device. In another embodiment of the present invention, the software and the hardware platforms can be combined into one layer of the network. The next layer is the wireless communication interface 405 that allows for each device to communicate with the other smart devices. Preferably, the wireless communication interface 405 in an IoT system interconnects all of the smart devices in the system. The wireless communication interface between the smart devices can be used in the relevant art can be used, such as Bluetooth 3G connections.

Figure 5:
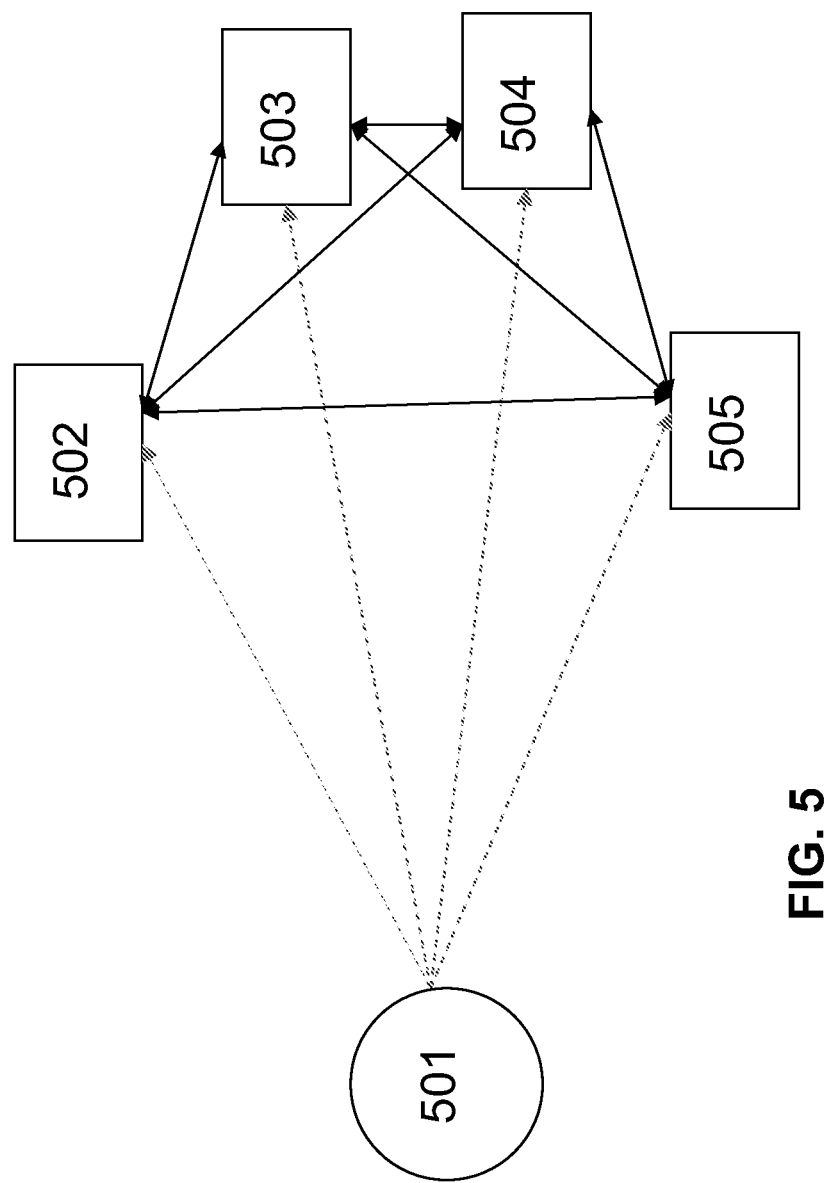
FIG. 5 displays a peer-to-peer network for executing a command on an optimal smart device according to a further embodiment of the present invention.

FIG. 5 displays a peer-to-peer network in a further embodiment of the present invention. An electronic device 501 is the source of the command, and transmits a command to a plurality of smart devices, 502, 503, 504, and 505. After the smart devices receive the command the plurality of smart devices determine their scores by calculating the weight allocated to each object rule. After calculating the score the plurality of smart devices negotiate between themselves to determine which smart device is the optimal device to execute the command. As shown in FIG. 5, each smart device communicates with each of the other devices to determine whether the score of each smart device is higher or lower than the other smart devices. The negotiation is done recursively until three out of the four smart devices shown in FIG. 5 concede and one smart device executes the command.

Figure 6:
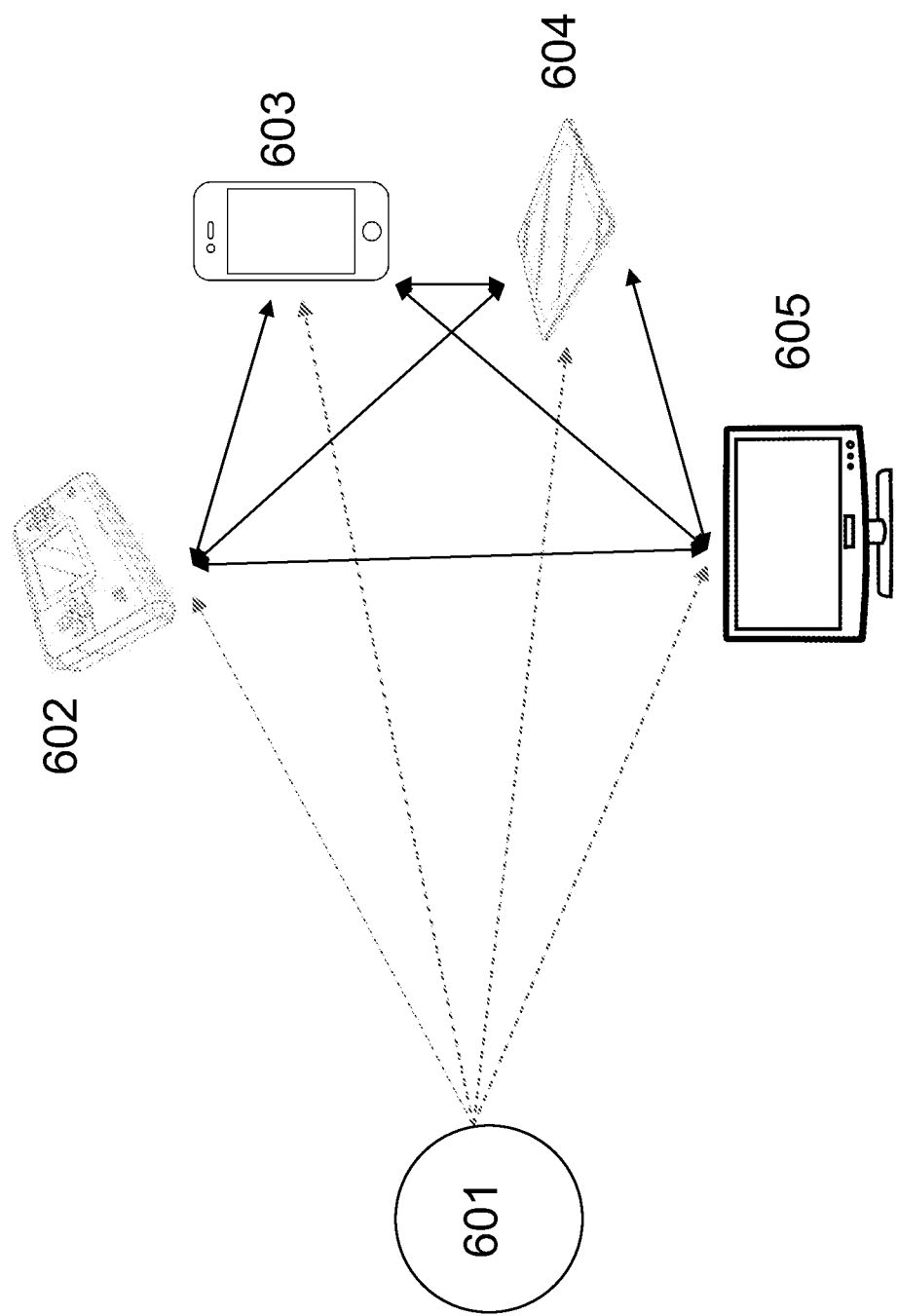
FIG. 6 is an example of a peer-to-peer network according to a further embodiment of the present invention.

FIG. 6 is an example of a peer-to-peer network according to an embodiment of the present invention. The command source 601 transmits a command to a plurality of smart devices. The plurality of smart devices include: a game console 602, a smart phone 603, a tablet 604, and a television 605. The command source 601 executes a command and each of the smart devices 602-605 receives the command. For example, if the command transmitted to the smart devices is to "turn on the television", each smart device receives the command and processes it. In this example, the tablet 604 is not equipped with the software to execute the command. This leaves the game console 602, the smart phone 603, and the television 605 to determine if the devices are capable of executing the command. All three smart devices will determine their score and negotiate between the smart devices to decide which device is the optimal smart device to execute the command. In this example, it is likely the television will execute the command since it can turn on the television directly without going through a remote or a wireless connection.

In another embodiment of the present invention more than one command can be received by the plurality of smart devices simultaneously. In this case, each device will calculate the score to assess its viability for each command separately. Thereafter, the smart devices will negotiate the scores between themselves, and considering the score, the smart devices will execute the command on at least one optimal smart device that can execute the command. In the event that more than one device responds with the same score, the method for determining which device should respond will be based on a number of factors including device ownership and an first-responded decision. Even though the devices will respond quickly, there will be differences in the timestamp associated with the response. In an embodiment of the present invention if the smart devices all have the same device owner, the earliest timestamp associated with a negotiation response will be deemed to be the device that will respond.

Figure 7:
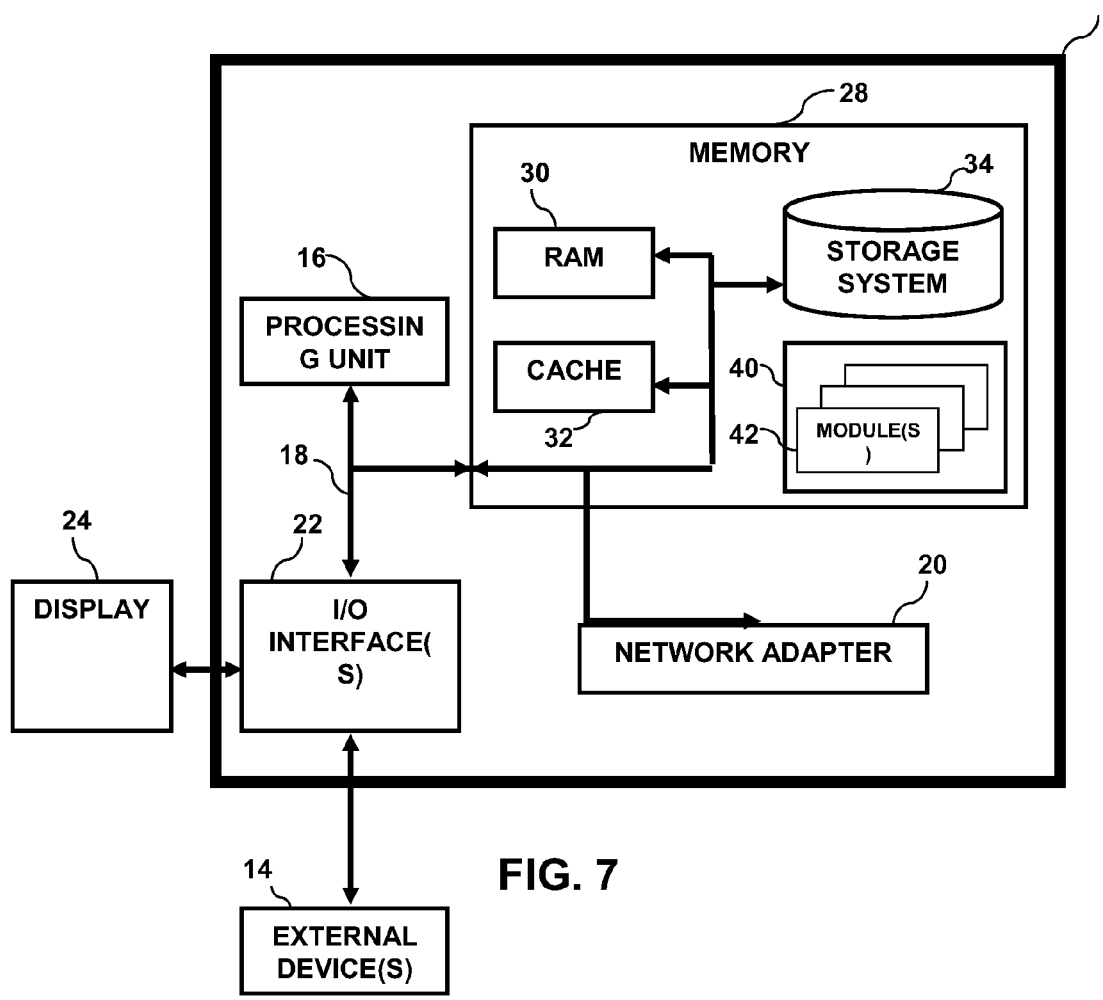
FIG. 7 shows computing machinery embedded in each smart device in a further embodiment of the present invention.

FIG. 7 shows computing machinery embedded in each smart device according to an embodiment of the present invention. FIG. 7 is a block diagram of an exemplary computer system/server 12 in detail, which is applicable to implement the embodiments of the present invention. Computer system/server 12 is only illustrative and is not intended to suggest any limitation as to the scope of use or functionality of embodiments of the invention described herein.

As shown in FIG. 7, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12 and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 (such as a keyboard, a pointing device, a display 24, etc.), one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to, microcode, device drivers, redundant processing units, external disk drive arrays, RAID systems, tape drives, and data archival storage systems, etc.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node is only one example of a suitable cloud computing node and is not intended to suggest any limitation as to the scope of use or functionality of embodiments of the present invention described herein. Regardless, cloud computing node is capable of being implemented and/or performing any of the functionality set forth hereinabove.

In cloud computing node there is a computer system/server 700, which is operational with numerous other general purpose or special purpose computing system environments or configurations. Examples of well-known computing systems, environments, and/or configurations that can be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 700 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 700 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 7, computer system/server 700 in cloud computing node 700 is shown in the form of a general-purpose computing device. The components of computer system/server 700 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 700 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 700 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Referring now to FIG. 6, an example illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 8:
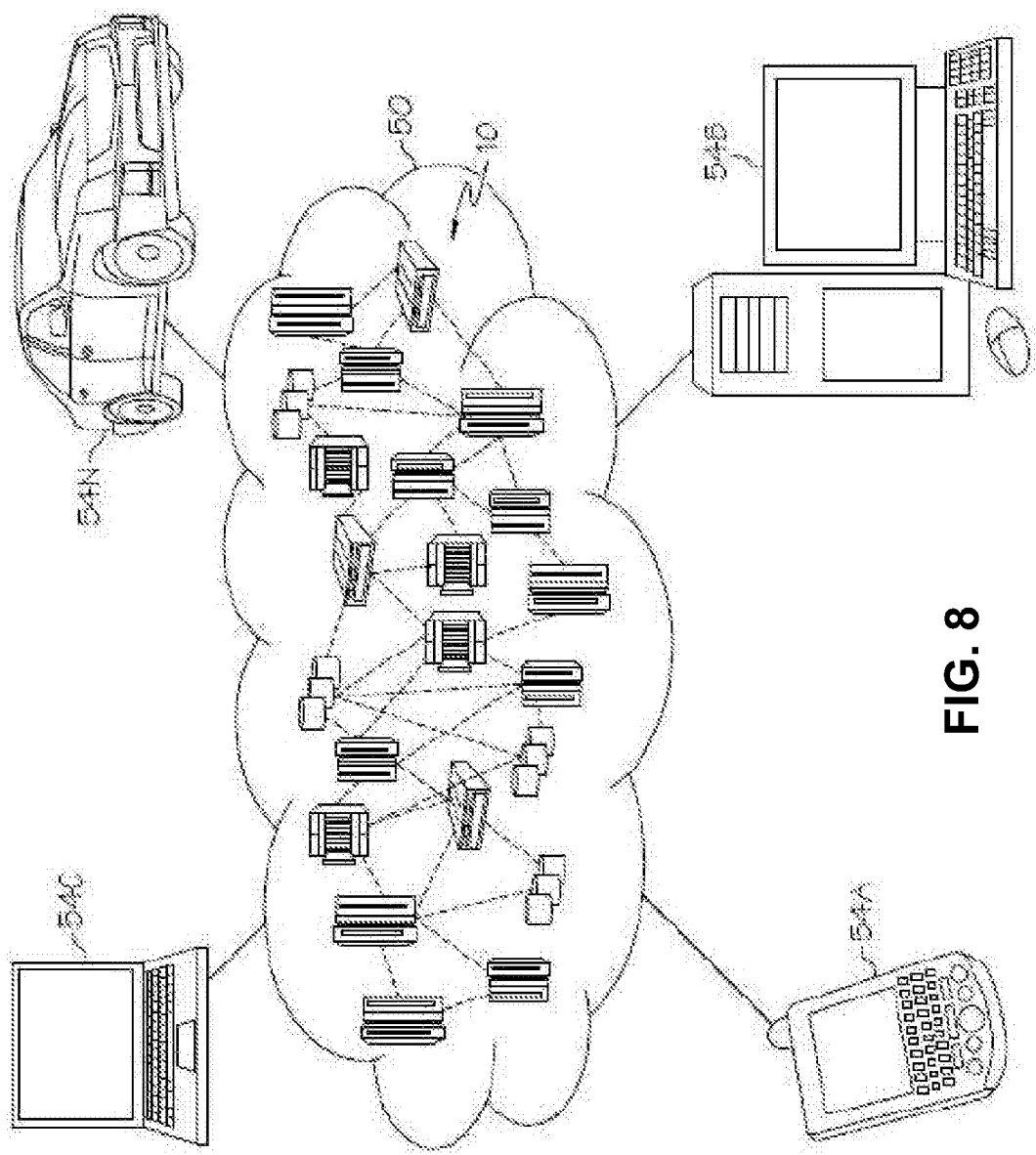
FIG. 8 depicts a cloud computing environment according to a further embodiment of the present invention.
Figure 9:
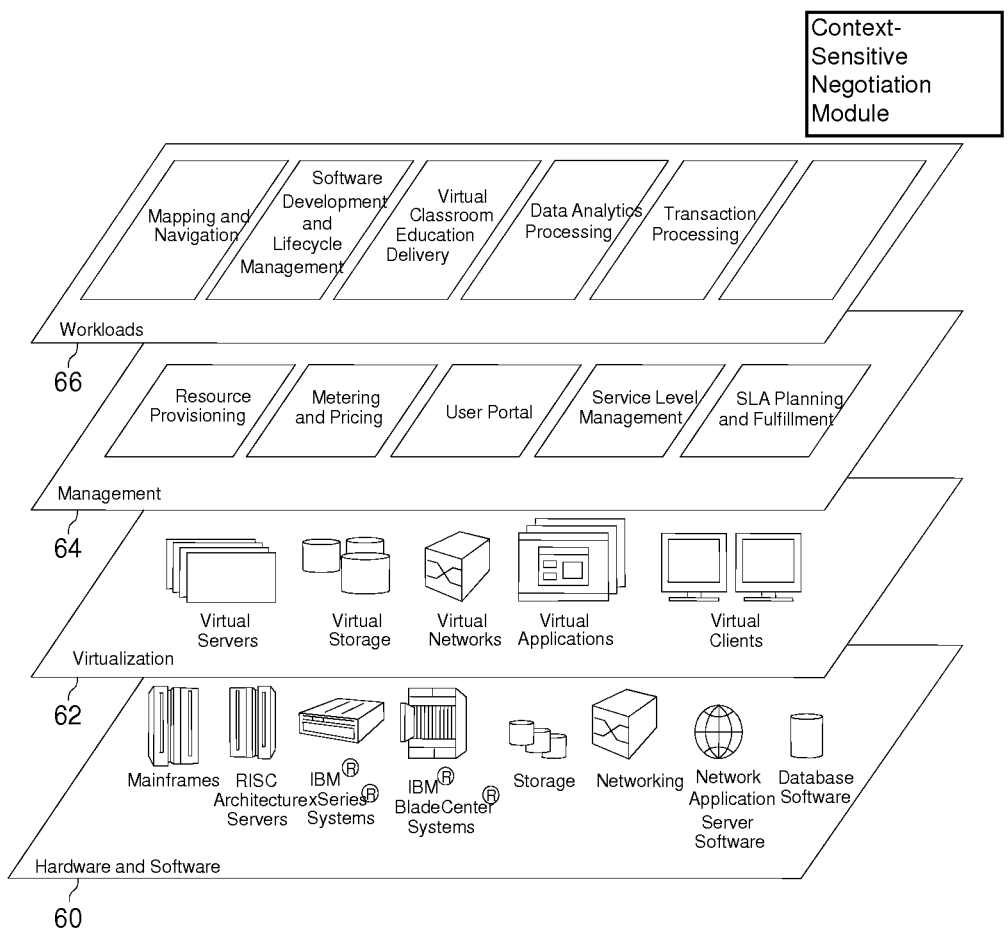
FIG. 9 depicts abstraction model layers according to a further embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and Context-Sensitive Negotiation Module (described in detail above).

What is claimed is:

1. A method for executing a command, the method comprising:
   receiving a command at a smart device;
   comparing a plurality of object rules of the smart device to the received command, each object rule having an associated weighted value, at least one of the object rules being a context-sensitive object rule defining a context of the smart device relative to the received command;
   determining, based on the comparison, whether any of the object rules of the smart device are met by the received command;
   determining, by the smart device, a score for the smart device, the score determined by combining the weighted values associated with each of the object rules of the smart device that are met by the received command;
   broadcasting the determined score to a plurality of smart devices associated with the smart device;
   receiving scores from the plurality of smart devices;
   comparing the determined score to the scores received from the plurality of smart devices;
   determining, based on the comparison, whether the smart device is the optimal smart device to execute the command; and
   executing the command on the smart device if the smart device is determined to be the optimal smart device to execute the command.

2. The method of claim 1, wherein the smart device is determined to be the optimal smart device to execute the command when the determined score is the higher than the scores received from the plurality of smart devices.

3. The method of claim 1, further comprising executing a deadlock rule when the determined score and at least one of the scores received from the plurality of smart devices have an equal score, wherein the deadlock rule determines whether the smart device or one of the smart devices of the plurality of smart devices having the equal score executes the command.

4. The method of claim 3, wherein the deadlock rule comprises a rule that when the scores of at least two smart devices are equal, the first smart device to receive the command executes the command.

5. The method of claim 1, wherein the plurality of object rules comprises an object rule that validates whether the smart device can execute the command.

6. The method of claim 5, further comprising:
   determining based on a comparison of the received command to the object rule that validates whether the smart device can execute the received command that the smart device cannot execute the received command; and
   setting the score of the smart device to zero in response to determining that the smart device cannot execute the received command.

7. The method of claim 1, further comprising:
   determining that the determined score is the lower than at least one of the scores received from the plurality of smart devices; and
   in response to determining that the determined score is the lower than at least one of the scores received from the plurality of smart devices, terminating the broadcast of the determined score to the plurality of smart devices.

8. A system for executing a command, the system comprising:
   a memory;
   a processor device coupled to the memory; and
   a context-sensitive negotiation module communicatively coupled to the memory and the processor device, the context sensitive negotiation module comprising the steps of a method comprising:
   receiving a command at a smart device;
   comparing a plurality of object rules of the smart device to the received command, each object rule having an associated weighted value, at least one of the object rules being a context-sensitive object rule defining a context of the smart device relative to the received command;
   determining, based on the comparison, whether any of the object rules of the smart device are met by the received command;
   determining a score for the smart device, the score determined by combining the weighted values associated with each of the object rules of the smart device that are met by the received command;
   broadcasting the determined score to a plurality of smart devices associated with the smart device;
   receiving scores from the plurality of smart devices;
   comparing the determined score to the scores received from the plurality of smart devices;
   determining, based on the comparison, whether the smart device is the optimal smart device to execute the command; and
   executing the command on the smart device if the smart device is determined to be the optimal smart device to execute the command.

9. The system of claim 8, wherein the smart device is determined to be the optimal smart device to execute the command when the determined score is the higher than the scores received from the plurality of smart devices.

10. The system of claim 8, further comprising executing a deadlock rule when the determined score and at least one of the scores received from the plurality of smart devices have an equal score, wherein the deadlock rule determines whether the smart device or one of the smart devices of the plurality of smart devices having the equal score executes the command.

11. The system of claim 10, wherein the deadlock rule comprises a rule that when the scores of at least two smart devices are equal, the first smart device to receive the command executes the command.

12. The system of claim 8, wherein the plurality of object rules comprises an object rule that validates whether the smart device can execute the command.

13. The system of claim 12, further comprising:
   determining based on a comparison of the received command to the object rule that validates whether the smart device can execute the received command that the smart device cannot execute the received command; and
   setting the score of the smart device to zero in response to determining that the smart device cannot execute the received command.

14. The system of claim 8, further comprising:
   determining that the determined score is the lower than at least one of the scores received from the plurality of smart devices; and
   in response to determining that the determined score is the lower than at least one of the scores received from the plurality of smart devices, terminating the broadcast of the determined score to the plurality of smart devices.

15. A computer program product for executing a command, the computer program product comprising a computer readable storage medium having program instructions embodied therewith, wherein the computer readable storage medium is not a transitory signal per se, the program instructions executable by a computer to cause the computer to perform a method comprising:
   receiving a command at a smart device;
   comparing a plurality of object rules of the smart device to the received command, each object rule having an associated weighted value, at least one of the object rules being a context-sensitive object rule defining a context of the smart device relative to the received command;
   determining, based on the comparison, whether any of the object rules of the smart device are met by the received command;
   determining, by the smart device, a score for the smart device, the score determined by combining the weighted values associated with each of the object rules of the smart device that are met by the received command;
   broadcasting the determined score to a plurality of smart devices associated with the smart device;
   receiving scores from the plurality of smart devices;
   comparing the determined score to the scores received from the plurality of smart devices;
   determining, based on the comparison, whether the smart device is the optimal smart device to execute the command; and
   executing the command on the smart device if the smart device is determined to be the optimal smart device to execute the command.

16. The computer program product of claim 15, wherein the smart device is determined to be the optimal smart device to execute the command when the determined score is the higher than the scores received from the plurality of smart devices.

17. The computer program product of claim 15, further comprising executing a deadlock rule when the determined score and at least one of the scores received from the plurality of smart devices have an equal score, wherein the deadlock rule determines whether the smart device or one of the smart devices of the plurality of smart devices having the equal score executes the command.

18. The computer program product of claim 17, wherein the deadlock rule comprises a rule that when the scores of at least two smart devices are equal, the first smart device to receive the command executes the command.

19. The computer program product of claim 15, wherein the plurality of object rules comprises an object rule that validates whether the smart device can execute the command.

20. The computer program product of claim 15, further comprising:

determining that the determined score is the lower than at least one of the scores received from the plurality of smart devices; and in response to determining that the determined score is the lower than at least one of the scores received from the plurality of smart devices, terminating the broadcast of the determined score to the plurality of smart devices.

\* \* \* \* \*